United States Patent
Keskes et al.

(10) Patent No.: US 9,372,273 B2
(45) Date of Patent: Jun. 21, 2016

(54) METHOD OF PROCESSING SEISMIC IMAGE OF THE SUBSURFACE

(71) Applicant: TOTAL SA, Courbevoie (FR)

(72) Inventors: Noomane Keskes, Abu Dhabi (AE); Jonathan Gallon, Abu Dhabi (AE); Yahui Yin, Stavenger (NO)

(73) Assignee: Total SA, Courbevoie (FR)

( * ) Notice: Subject to any disclaimer, the term of this patent is extended or adjusted under 35 U.S.C. 154(b) by 0 days.

(21) Appl. No.: 14/441,774

(22) PCT Filed: Nov. 7, 2013

(86) PCT No.: PCT/IB2013/002627
§ 371 (c)(1),
(2) Date: May 8, 2015

(87) PCT Pub. No.: WO2014/072811
PCT Pub. Date: May 15, 2014

(65) Prior Publication Data
US 2015/0285931 A1     Oct. 8, 2015

(30) Foreign Application Priority Data

Nov. 8, 2012  (EP) ..................................... 12306379

(51) Int. Cl.
| G06K 9/00 | (2006.01) |
| G01V 1/30 | (2006.01) |
| G01V 1/32 | (2006.01) |
| G01V 1/34 | (2006.01) |

(52) U.S. Cl.
CPC ........... *G01V 1/30* (2013.01); *G01V 1/301* (2013.01); *G01V 1/325* (2013.01); *G01V 1/34* (2013.01); *G01V 2210/641* (2013.01); *G01V 2210/661* (2013.01); *G01V 2210/74* (2013.01)

(58) Field of Classification Search
None
See application file for complete search history.

(56) References Cited

U.S. PATENT DOCUMENTS

| 8,321,134 | B2 * | 11/2012 | Al-Saleh | ................ | G01V 1/364 702/14 |
| 2012/0090834 | A1 * | 4/2012 | Imhof | ...................... | G01V 1/32 166/250.01 |
| 2013/0151161 | A1 * | 6/2013 | Imhof | .................... | G01V 1/003 702/14 |

* cited by examiner

*Primary Examiner* — Bhavesh Mehta
*Assistant Examiner* — Oneal R Mistry
(74) *Attorney, Agent, or Firm* — Patterson Thuente Pedersen, P.A.

(57) ABSTRACT

The present invention relates to a method of processing seismic image of the subsurface. The method comprises determining two surfaces in the seismic image, the two surfaces being extracted from well data from at least on well in the subsurface; determining the dip components the first surface and the second surface; determining interpolated dip components based on dip components of the two surfaces; determining an interpolated surface based on at least the interpolated dip components; determining a density value based on a number of intersections of the determined surfaces with a column comprising said current pixel; determining a geological-time image, columns of said geological-time image are computed based on the density values of pixels of a corresponding column of the seismic image; and on the color value of pixels of the corresponding column of the seismic image.

6 Claims, 4 Drawing Sheets

METHOD OF PROCESSING SEISMIC IMAGE OF THE SUBSURFACE

RELATED APPLICATIONS

The present application is a National Phase entry of PCT Application No. PCT/IB2013/002627, filed Nov. 7, 2013, which claims priority from EP Patent Application No. 12306379.4, filed Nov. 8, 2012, said applications being hereby incorporated by reference herein in their entirety.

BACKGROUND OF THE INVENTION

The present invention relates to the processing of images of the subsurface and especially to the transformation of seismic images into chrono-stratigraphic representations.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

It is known, especially in oil exploration, to determine the position of oil reservoirs from the results of geophysical measurements carried out from the surface or in well bores. According to the technology of reflection seismology, these measurements involve emitting a wave (acoustic waves or electromagnetic radiation) into the subsurface and measuring a signal comprising a plurality of echoes of the wave on geological structures being investigated. These structures are typically surfaces separating distinct materials, faults, etc. Other measurements are carried out from wells.

Chrono-stratigraphic analysis (sequence stratigraphic analysis) is very important to understand basin evolution, predict the sedimentary facies distribution for both petroleum exploration and development. This analysis is based on the fundamental assumption that seismic reflectors are surfaces of chrono-stratigraphic significance. This assumption implies that an individual seismic reflector is a "time-line" through a depositional basin that represents a surface of the same geologic age. Faults are excluded from this definition.

A seismic cross section is formed by the juxtaposition in a plane of sampled one-dimensional signals referred to as seismic traces (2D). Likewise, a seismic block is formed by the juxtaposition of seismic traces in a volume (3D seismic image). The expression "seismic image" refers either to a seismic cross section or a seismic block.

In a seismic image, the luminous intensity of a pixel is proportional to the seismic magnitude represented by one-dimensional signals.

Computing a chrono-stratigraphic representation of a seismic image often requires, in regard of the previous methods, the synthesis of seismic horizons in the cross section or the block.

Several methods have been devised for carrying out syntheses of horizons. For instance, the thesis by Marc Donias, submitted on Jan. 28, 1999 to the University of Bordeaux 1 and entitled "*Caractérisation de champs d'orientation par analyse en composantes principales et estimation de la courbure. Application aux images sismiques, [Characterization of orientation fields by principal components analysis and estimation of curvature. Application to seismic images]*", describes in detail possible schemes for carrying out horizon synthesis. The U.S. Pat. No. 6,771,800 B1 also describes a possible method to create chrono-stratigraphic interpretation of a seismic image.

Such methods have drawbacks especially if the resolution of the seismic image is very low or contains a high noise level. In such case, computed horizons of the seismic images may be erroneous and thus may provide inadequate results. In addition, these methods may be erroneous if the assumption that seismic reflectors are surfaces of chrono-stratigraphic significance is false.

There is thus a need for improving the computation chrono-stratigraphic representation in such cases.

SUMMARY OF THE INVENTION

The invention relates to a method of processing seismic image of the subsurface, said seismic image comprising pixels, each pixel having a color value.
The method comprises:
  determining a first surface and a second surface in the seismic image, the first surface and the second surface being determined based on geological information extracted from well data from at least one well in the subsurface;
  determining first dip components for pixels of the first surface and second dip components for pixels of the second surface;
  for each pixel of the seismic image between the first surface and the second surface, determining interpolated dip components based on at least the first dip components and the second dip components.
  for each pixel of the seismic image between the first surface and the second surface, determining an interpolated surface based on at least the interpolated dip components for pixels between the first surface and the second surface;
  for each current pixel of the seismic image between the first surface and the second surface, determining a density value based on a number of intersections of the determined surfaces with a column comprising said current pixel, said intersections being below said pixel in said column;
  determining a geological-time image, columns of said geological-time image is computed based:
    on the density values of pixels of a corresponding column of the seismic image;
    on the color value of pixels of the corresponding column of the seismic image.

A "surface" may be a 1D curve (if the seismic image is a 2D image) and a 2D surface (if the seismic image is a 3D image).

"Geological information" is a piece of information based on geological considerations. A seismic image does contains any geological information extracted from well data as the seismic image may be computed based on acoustic signals, without the need of any wells.

The "dip components" of a pixel are related to the components of local gradient for said pixels (e.g. the local gradient of the luminous intensity at said pixel).

For instance, a given pixel is between a first surface and a second surface if there is a line connecting a pixel of the first surface and a pixel of the second surface, said line comprising said given pixel.

The determined interpolated surface τ may be based on calculating a non-linear partial derivative equation based on the interpolated dip p:

$$\nabla\tau(x,y,t) = p(x,y,t+\tau(x,y,t))$$

Therefore, it is possible to determine a geological-time representation even if the seismic layers of the seismic image do not provide an accurate time representation of the subsurface (i.e. if the seismic reflectors are not surfaces of chrono-stratigraphic significance).

In addition, the method may further comprise:

receiving a first well data associated with points of a first well and a second well data associated with points of a second well;

identifying a first point in the first well and a second point in the second well, the first point and the second point having a same identified relative time in said well data.

Said first surface may comprise the first point and the second point.

In a possible embodiment, the first surface may be determined based on a regression algorithm. In addition, said surface may be determined based on a trend map determined an operator, and thus received.

It is possible that all identified points cannot be on a surface determined by the determination algorithm (e.g. over-determined systems). Thus, it is possible to determine the surface that minimizes the sum of the squares of the errors made in the results (least square method).

In addition, the interpolated dip components may be computed based on a multivariate interpolation, the interpolation being known for dip components at pixels on the first surface and at pixels of the second surface.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

A third aspect relates to a device for processing seismic image of the subsurface, said seismic image comprising pixels, each pixel having a color value.

The device comprises:

a circuit for determining a first surface and a second surface in the seismic image, the first surface and the second surface being determined based on geological information extracted from well data from at least one well in the subsurface;

a circuit for determining first dip components for pixels of the first surface and second dip components for pixels of the second surface;

for each pixel of the seismic image between the first surface and the second surface, a circuit for determining interpolated dip components based on at least the first dip components and the second dip components.

for each pixel of the seismic image between the first surface and the second surface, a circuit for determining an interpolated surface based on at least the interpolated dip components for pixels between the first surface and the second surface;

for each current pixel of the seismic image between the first surface and the second surface, a circuit for determining a density value based on a number of intersections of the determined surfaces with a column comprising said current pixel, said intersections being below said pixel in said column;

a circuit for determining a geological-time image, columns of said geological-time image is computed based:

on the density values of pixels of a corresponding column of the seismic image;

on the color value of pixels of the corresponding column of the seismic image.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1b is a possible chrono-stratigraphic representation of the seismic image of FIG. 1a;

DETAILED DESCRIPTION OF THE DRAWINGS

Figure 1B:
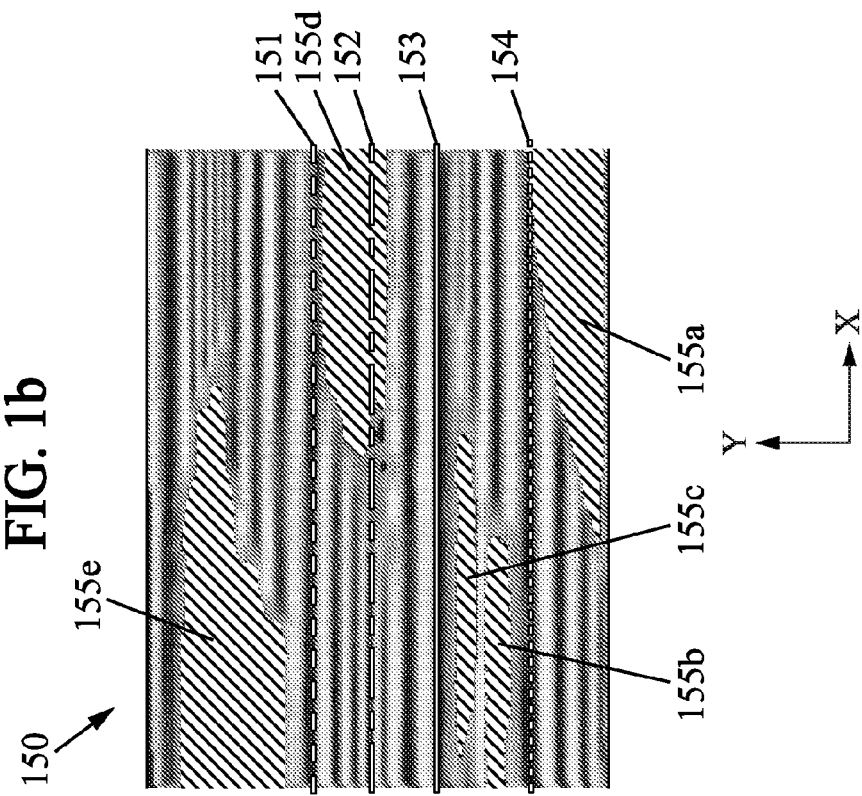
Figure 1A:
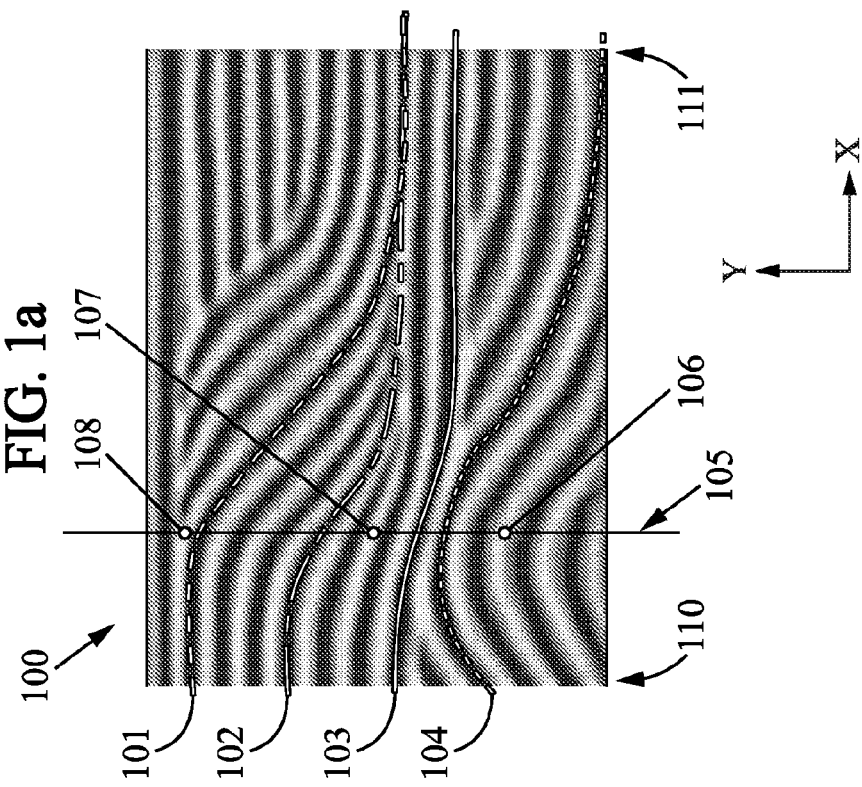
FIG. 1a is a possible seismic image.

FIG. 1a is a possible seismic image 100. This image is a 2D section of a seismic image. It represents a picture of the subsoil arising from a seismic exploration survey. The image section 100 comprises two dimensions: it is defined by a horizontal extension along a horizontal axis $\vec{x}$ and by a vertical extension along a vertical axis $\vec{y}$ in the direction of the subsoil. The image section 100 is composed of pixels regularly distributed according to a horizontal pitch on the horizontal axis and a vertical pitch on the vertical axis. The seismic image 100 comprises:

a number of columns of pixels which is equal to the quotient of the horizontal extension divided by the horizontal pitch, and a number of pixels per column which is equal to the quotient of the vertical extension divided by the vertical pitch.

Most of the time, pixels are associated with a color value (gray value) between 0 and 255 (or 65535). The color values are often based on the amplitude of a seismic signal associated with said image (e.g. high amplitude would be manifested by a bright pixel and low amplitude by a dark pixel).

In particular, the vertical black line 105 represents a column of pixels.

To implement the method according to the invention, it is possible to define a matrix M (or density matrix/map) which has the same dimensions of the image 100:

the number of rows of the matrix M is equal to the number of pixels in a column of the image 100 and the number of columns of the matrix M is equal to the number of columns of the image 100 (i.e. the number of pixels in a line).

The matrix M thus consists of as many elements as there are pixels in the image 100 and each element is associated with a pixel of the image 100. All the elements of the matrix M are integers (or floating numbers) initially having a zero value.

For some pixels of the image 100 (preferably each pixel), it is possible to compute a curve coming through the pixel and transverse to the vertical dimension of the image section 100 (extend from one side 110 of the seismic image to the opposite side 111 of the seismic image). The calculation of this curve may involve calculating a local gradient p (or a local dip) of the luminous intensity at said pixel. Said dip/gradient may be provided by an input matrix (pre-computed matrix) or may be computed directly based on the seismic image 100. The gradient may have a vertical component and a horizontal component.

The computed curves (e.g. 101, 102, 103, 104) are also known as "horizons" or "seismic horizons". The computation of said horizons τ deal with a non-linear partial derivative equation based on local dip p estimated from the seismic image to evaluate iteratively the horizon. Thus the horizon τ verifies the following formula:

$$\nabla \tau(x,y,t) = p(x,y,t+\tau(x,y,t))$$

Some other possible computations of said horizons are described in U.S. Pat. No. 6,771,800 B1 or in application FR1158947.

Once the horizons are computed, it is possible to determine the values of the matrix M. For each pixel of the seismic image, it is possible to determine a density value as the number of intersections of the horizons with the column comprising said pixel, said intersections being below said pixel in said column. Said density value is stored in the matrix M at same coordinates as said pixel.

For instance, for pixel 106, the density value is 0 as there is no intersection of the column 105 and the computed horizon 101, 102, 103, 104 below the pixel 106 (i.e. an intersection having the y coordinate less than the y coordinate of pixel 106).

For pixel 107, the density value is 2 as there is two intersections of the column 105 and the computed horizon 101, 102, 103, 104 below the pixel 107 (i.e. an intersection having the y coordinate less than the y coordinate of pixel 107): these intersections are the intersections of horizons 103 and 104 with the column 105.

For pixel 108, the density value is 4 as there is four intersections of the column 105 and the computed horizon 101, 102, 103, 104 below the pixel 108 (i.e. an intersection having the y coordinated less than the y coordinate of pixel 108): these intersections are the intersections of horizons 101, 102, 103 and 104 with the column 105.

It is possible to interpolate the density value of a pixel in a given column and between two computed curves. This interpolation is based on the density value corresponding to the two pixels on the intersections of said two curves with said column. This computation may take in account the distance of the pixel with the intersections. For instance:

$$DV = \frac{DV1 * D1 + DV2 * D2}{D1 + D2}$$

with DV the density value corresponding to the current pixel, DV1 the density value corresponding to the pixel of the first intersection, DV2 the density value corresponding to the pixel of the second intersection, D1 the distance between the pixel and the pixel of the first intersection, D2 the distance between the pixel and the pixel of the second intersection.

FIG. 1b is a possible chrono-stratigraphic representation of the seismic image of FIG. 1a.

The chrono-stratigraphic representation 150 is computed based on the density matrix and the seismic image. For instance, the chrono-stratigraphic representation (which is an image of the same dimensions of the seismic image) is computed column by column.

For a pixel i of a current column c in the chrono-stratigraphic representation, a color value is associated with said pixel according the following formula:

$$SI[c; i] = CS\left[\frac{M[c; i]}{M_{max}} I_{max}\right]$$

with SI[x;y] the color value of the seismic image at coordinates (x,y), CS[x;y] the color value of the chrono-stratigraphic representation at coordinates (x,y), M[x,y] the density value in the matrix M at coordinates (x,y), $M_{max}$ the maximum density value (which may be M(1,1) if (1,1) is the coordinates of the top left pixel in the seismic image), and $I_{max}$ is the height of the seismic image (in pixel).

The horizons 101, 102, 103, 104 are thus transformed into horizontal lines respectively 151, 152, 153, 154 (as the density values of pixels on these horizons are constant)

It may happen that some pixels of the chrono-stratigraphic representation may not be defined according the above formula: these zones of pixels are identified as "hiatus" (a zone of the subsoil that lacks of deposit or reflects an erosion phenomenon, e.g. 155a, 155b, 155c, 155d, 155e).

Figure 2:
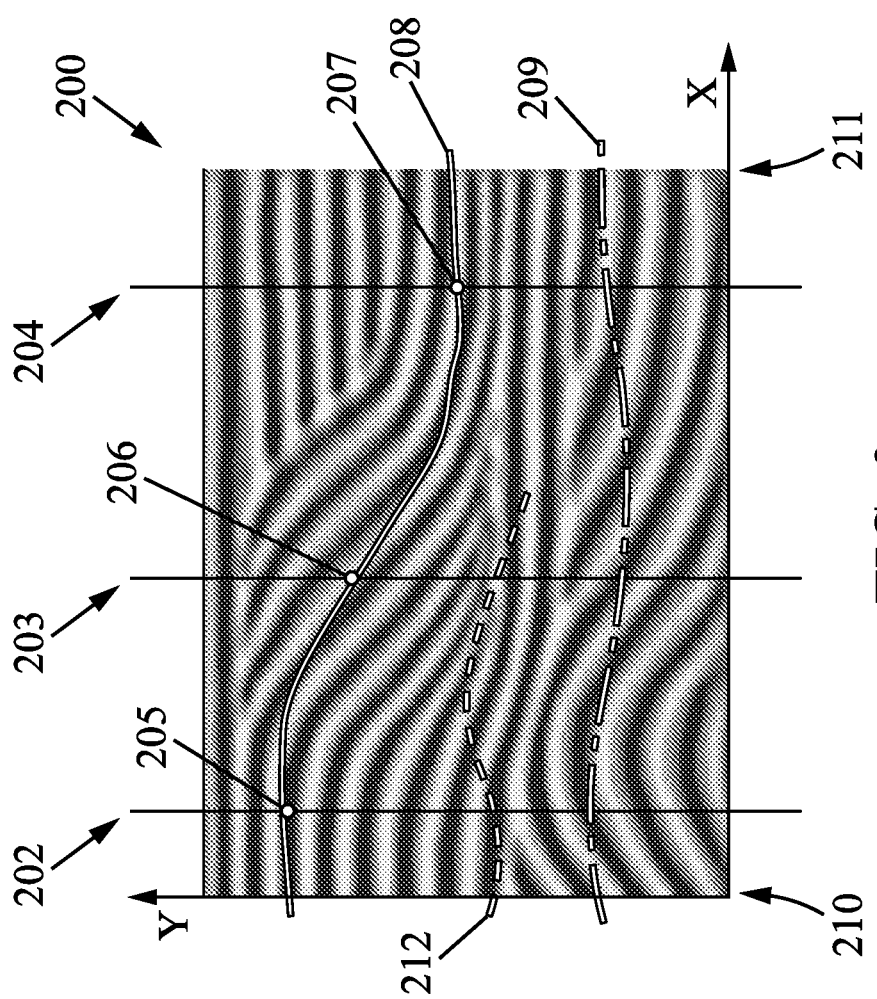
FIG. 2 is a representation of a determination of a surface according to a possible embodiment of the present invention.

FIG. 2 is a representation of a determination of a surface according to a possible embodiment of the present invention.

If the amplitude of a seismic signal may provide useful information on the time of sedimentation of the layer but it is possible that this information is erroneous: for instance, it is possible that during a same sedimentation process heavy deposits are transported to a given point when light deposits are transported to another point (for instance for "delta" sedimentation, alluvial fan, etc.). Therefore, the assumption that seismic reflectors are surfaces of chrono-stratigraphic significance is false in such cases. Even if the depositions do not have the same composition (and thus a different appearance on the seismic image) the relative time of the sedimentation are the same.

Thus, the only seismic information is not sufficient to create a reliable chrono-stratigraphic representation. In order to mitigate this issue, geologists may tag specific points on the seismic image with a time value that they may be able to determine (either thanks to their knowledge of the subsoil or thanks to well data that may be issued from wells and that is interpreted).

For instance, vertical lines 202, 203 and 204 may represent vertical well in the subsoil. The surface 201 may represent the automatically computed horizon based on the dip of the seismic image as described above.

Geologists may, based on the well data, determine that points 205, 206 and 207 (respectively in wells 202, 203 and 204) of the seismic image have same relative time i.e. same sedimentation time (for instance by analyzing pieces of rocks according to Carbon-14 dating method or by grasping the overall sedimentation process).

Thus, it is possible to determine a new surface 208 that comes through all these points, geologists may provide/use trend maps that they have established thanks to their knowledge of the subsoils. This determination may also use a simple regression algorithm such as a linear regression, a polynomial regression, logistic regression, multinomial regression, etc. based on the points 205, 206, 207.

Once the surface 208 is determined, it is possible to determine a local dip $p_{208}$ for points of said surface 208 (for instance, for all points along the surface). This local dip $p_{208}$ represents a unit vector, perpendicular to the surface.

A surface 209 may be determined based on the above proposed algorithm.

Once this surface 209 is determined, a local dip $p_{209}$ may also be determined for points of said surface 209.

Thanks to all determined local dips $p_{208}$ and $p_{209}$, it is possible to determine an interpolated local dip $p_{inter}$ for each point between these two surfaces 208 and 209 thanks to a 2D interpolation (if the seismic image is 2D) or a 3D interpolation (if the seismic image is 3D).

Thanks to this new dip p (i.e. the union of $p_{208}$, $p_{209}$, $p_{inter}$), it is possible to determine as many horizons as wished between the surface 208 and the surface 209 (e.g. for each points between the surface 208 and the surface 209) as detailed above in relation of FIG. 1a.

Therefore, a density map M may be determined for points between surfaces 208 and 209 as detailed above in relation of FIG. 1a.

Finally, a determination of the chrono-stratigraphic representation (of at least the subsoil zone between surfaces 208 and 209) is possible described above.

In such embodiment, the chrono-stratigraphic representation is not computed thanks to horizon computations (i.e. issued from the seismic image).

There is no requirement that the surface 208 and the cur surface ve 209 is defined from one side 210 of the seismic image to an opposite side 211. For instance, a surface 212 may be determined (based on the above proposed algorithm) even if it does not extends across the seismic image.

In such case, a local dip $p_{212}$ may also be determined for points of said surface 212. Then, the dip interpolation for points between surface 209 and surface 208 is constrained by the local dip $p_{212}$.

The interpolation of the local dip p may be a bilinear interpolation (2D case) or a trilinear interpolation (3D case), each component of the local dip being independently computed.

Figure 3:
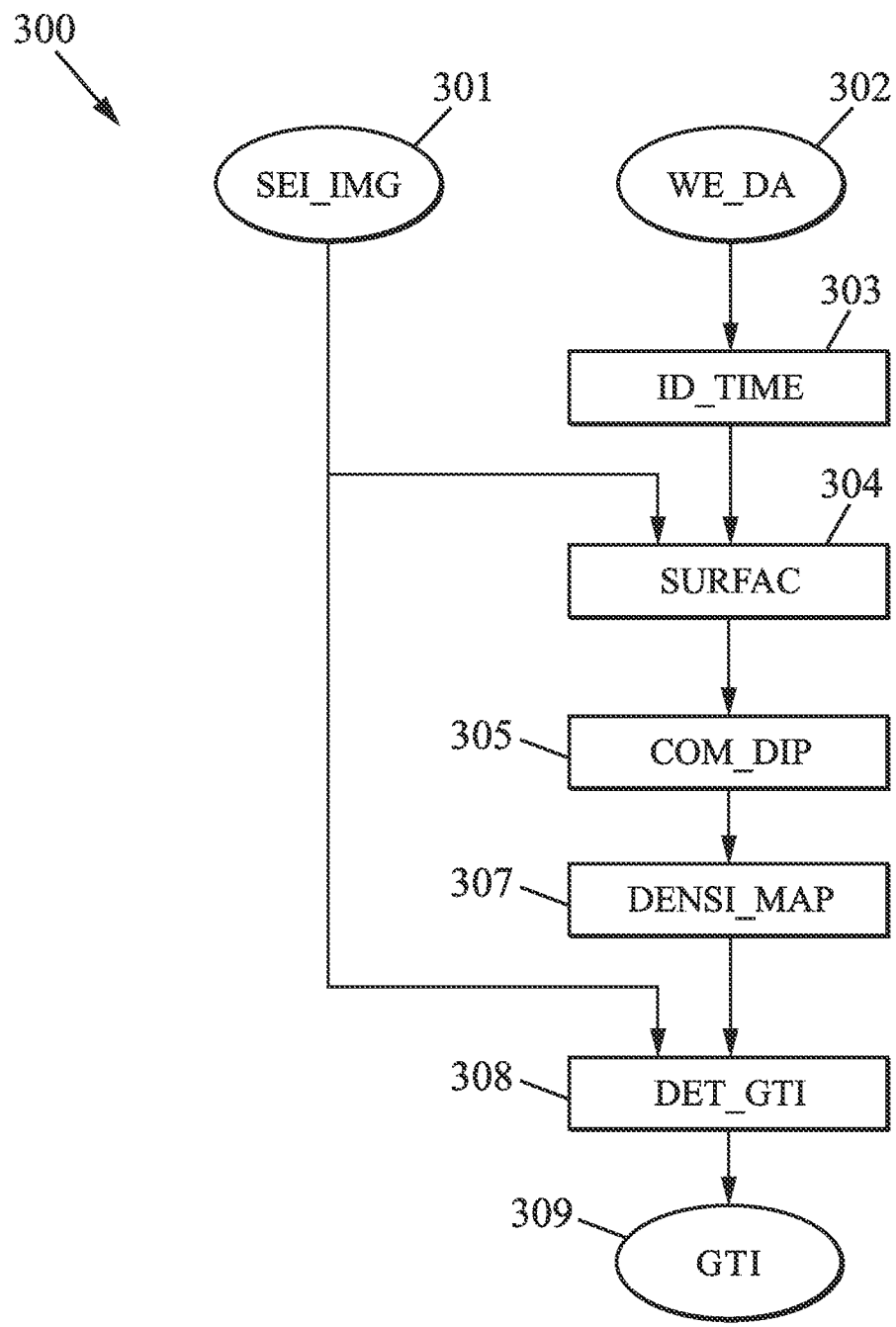
FIG. 3 is a flow chart describing a possible embodiment of the present invention.

FIG. 3 is a flow chart describing a possible embodiment of the present invention.

The seismic image 301 comprises pixels, each pixel having a color value.

Upon reception of well data (302) from at least one well in the subsurface, it is possible to determine (step 303) different points of said well data having a same relative sedimentation time: the sedimentation time may be provided thanks to geological information extracted/calculated from well data. Thus, it is possible to determine (step 304) at least one surface in the seismic image. The surface is determined thanks to the determined points having the same relative sedimentation time and thanks, if they are available, to trend maps that geologists may establish. Regression algorithm may ease the determination of such surface. This determination is described in relation of FIG. 2.

Thanks to the determined surfaces, it is possible to create (step 305) a dip map as described above.

Thus, it is possible to determine (step 307) a plurality of surfaces based on the created dip map and then, to determine a density map: for each current pixel of the seismic image, a density value is determined based on a number of intersections of the determined surfaces (or the combined curved if the steps 305 and 306 are executed) with a column comprising said current pixel. The considered intersections are below said pixel in said column.

Thanks to the determined density map (or density matrix), it is possible to transform the received seismic image (301) into a chrono-stratigraphic representation (step 308) as described in relation of FIG. 1b and based on based on the density values of pixels of a corresponding column of the seismic image and on the color value of pixels of the corresponding column of the seismic image.

Finally, the chrono-stratigraphic representation/image (309) may be outputted for further processing or interpretation(s).

Figure 4:
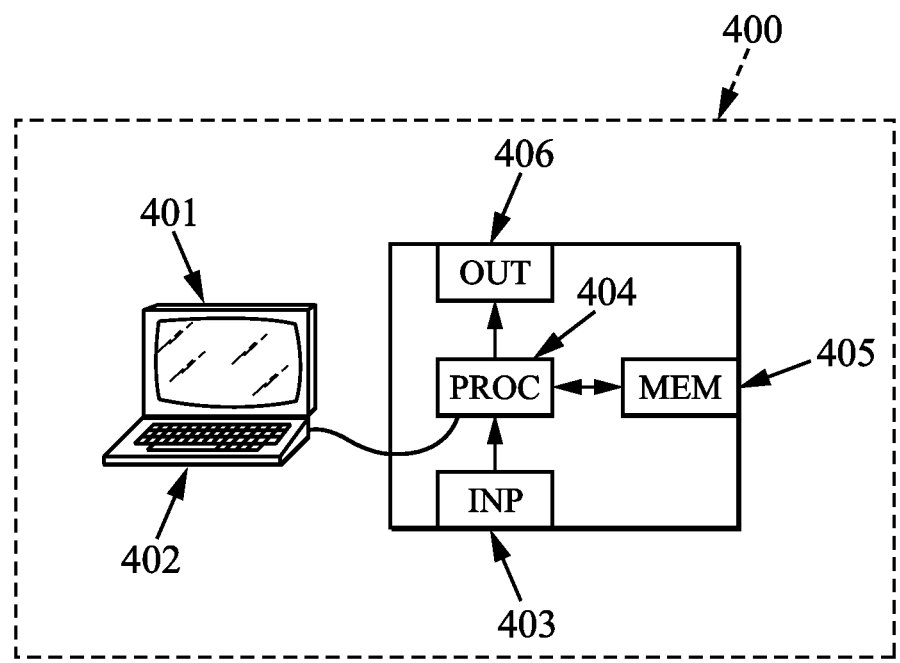
FIG. 4 is a possible embodiment for a device that enables the present invention.

Part of this flow chart can represent steps of an example of a computer program which may be executed by the device of FIG. 4.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
  a processor or a processing unit adapted to interpret instructions in a computer language, the processor or the processing unit may comprise, may be associated with or be attached to a memory comprising the instructions, or
  the association of a processor processing unit and a memory, the processor or the processing unit adapted to interpret instructions in a computer language, the memory comprising said instructions, or
  an electronic card wherein the steps of the invention are described within silicon, or
  a programmable electronic chip such as a FPGA chip (for <<Field-Programmable Gate Array>>).

This computer comprises an input interface 403 for the reception of the seismic image and of the well data according to the invention and an output interface 406 for providing a chrono-stratigraphic representation of the seismic image.

To ease the interaction with the computer, a screen 401 and a keyboard 402 may be provided and connected to the computer circuit 404.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

For instance, all the figures are presented in 2-dimensions. Nevertheless, it is apparent that the seismic images may be 3D images and thus, the surfaces or horizons or curves may be two-dimensional, topological manifold.

The invention claimed is:

1. A method of processing seismic image of the subsurface, said seismic image comprising pixels, each pixel having a color value,
  wherein the method comprises:
    determining a first surface and a second surface in the seismic image, the first surface and the second surface being determined based on geological information extracted from well data from at least one well in the subsurface;
    determining first dip components for pixels of the first surface and second dip components for pixels of the second surface;
    for each pixel of the seismic image between the first surface and the second surface, determining interpolated dip components based on at least the first dip components and the second dip components, for each pixel of the seismic image between the first surface and the second surface, determining an interpolated surface based on at least the interpolated dip components for pixels between the first surface and the second surface;

for each current pixel of the seismic image between the first surface and the second surface, determining a density value based on a number of intersections of the determined surfaces with a column comprising said current pixel, said intersections being below said pixel in said column;

determining a geological-time image, columns of said geological-time image is computed based:
   on the density values of pixels of as corresponding column of the seismic image; and
   on the color value of pixels of the corresponding column of the seismic image.

2. The method according to claim 1, wherein the method further comprises:
   receiving a first data associated with points of a first well and a second well data associated with points of a second well;
   identifying a first point in the first well and a second point in the second well, the first point and the second point having a same identified relative time in said well data;
wherein said first surface comprises the first point and the second point.

3. The method according to claim 1, wherein the first surface is determined based on a regression algorithm.

4. The method according to claim 1, wherein the interpolated dip components are computed based on a multivariate interpolation, the interpolation being known for dip components at pixels on the first surface and at pixels of the second surface.

5. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

6. A device for processing seismic image of the subsurface, said seismic image comprising pixels, each pixel having a color value,
   wherein the device comprises a computer, the computer including a memory for storing a program to perform a method for processing seismic images:
   wherein the method comprises:
      a circuit for determining a first surface and a second surface in the seismic image, the first surface and the second surface being determined based on geological information extracted from well data from at least one well in the subsurface;
      a circuit for determining first dip components for pixels of the first surface and second dip components for pixels of the second surface;
      for each pixel of the seismic image between the first surface and the second surface, a circuit for determining interpolated dip components based on at least the first dip components and the second dip components,
      for each pixel of the seismic image between the first surface and the second surface, a circuit for determining an interpolated surface based on at least the interpolated dip components for pixels between the first surface and the second surface;
      for each current pixel of the seismic image between the first surface and the second surface, a circuit for determining a density value based on a number of intersections of the determined surfaces with a column comprising said current pixel, said intersections being below said pixel in said column;
      a circuit for determining a geological-time image, columns of said geological-time image is computed based:
         on the density values of pixels of a corresponding column of the seismic image;
         on the color value of pixels of the corresponding column of the seismic image.

\* \* \* \* \*